United States Patent
Baughman et al.

(10) Patent No.: US 12,517,571 B2
(45) Date of Patent: Jan. 6, 2026

(54) GENERATIVE ARTIFICIAL INTELLIGENCE SYSTEM FOR CREATING MOVEMENT IN A PHYSICAL ENVIRONMENT

(71) Applicant: INTERNATIONAL BUSINESS MACHINES CORPORATION, Armonk, NY (US)

(72) Inventors: Aaron K. Baughman, Cary, NC (US); Chandankumar Johakhim Patel, Fairborn, OH (US); Eduardo Morales, Key Biscayne, FL (US); Rahul Agarwal, Jersey City, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/504,544

(22) Filed: Nov. 8, 2023

(65) Prior Publication Data
US 2025/0147574 A1    May 8, 2025

(51) Int. Cl.
*G06F 3/01*    (2006.01)

(52) U.S. Cl.
CPC .............. *G06F 3/011* (2013.01); *G06F 3/016* (2013.01)

(58) Field of Classification Search
CPC ........... G06F 3/01–016; G06F 2203/012–014; G06N 3/045–0455; G06N 3/047–048;
(Continued)

(56) References Cited

U.S. PATENT DOCUMENTS

| | | |
|---|---|---|
| 9,298,863 B2 | 3/2016 | Hazan et al. |
| 9,898,912 B1 | 2/2018 | Jordan, II et al. |

(Continued)

FOREIGN PATENT DOCUMENTS

| | | |
|---|---|---|
| CN | 102666030 A | 9/2012 |
| CN | 106843211 A | 6/2017 |

(Continued)

OTHER PUBLICATIONS

Choi, S. et al., "An experimental study of perceived instability during haptic texture rendering: Effects of collision detection algorithm," In11th Symposium on Haptic Interfaces for Virtual Environment and Teleoperator Systems, 2003, HAPTICS 2003, Proceedings, Mar. 2, 20032, pp. 197-204, IEEE.

(Continued)

*Primary Examiner* — Keith L Crawley
(74) *Attorney, Agent, or Firm* — CHIP LAW GROUP

(57) ABSTRACT

Creating movement in a physical environment includes extracting, by computer hardware, digital features from interactions of a user with a digital environment that models a physical environment. Physical features are extracted by the computer hardware from sensor data generated from detected interactions of the user with the physical environment. A recommendation is generated by the computer hardware for the user within the physical environment based on a correlation of the digital features with the physical features. The recommendation is provided to the user. Providing the recommendation may include generating haptic signals by decoding, using a decoder stage executed by the computer hardware, the physical features and the recommendation, wherein the haptic signals specify a movement of the user within the physical environment in furtherance of the recommendation.

20 Claims, 6 Drawing Sheets

(58) Field of Classification Search
CPC ............ G06T 9/002; G06V 10/70–87; G06V 40/20–28; G06V 40/60–67
See application file for complete search history.

(56) References Cited

U.S. PATENT DOCUMENTS

| | | | |
|---|---|---|---|
| 2012/0166077 A1* | 6/2012 | Herzog .............. | G01C 21/3652 701/425 |
| 2018/0005312 A1* | 1/2018 | Mattingly ........... | G06F 3/04815 |
| 2018/0182177 A1 | 6/2018 | Rum | |
| 2019/0244092 A1* | 8/2019 | Baughman ............... | G06N 7/01 |
| 2019/0334426 A1* | 10/2019 | Culbertson ............. | G06F 3/016 |
| 2019/0366154 A1* | 12/2019 | Callaghan .......... | A63B 21/0724 |
| 2020/0020162 A1* | 1/2020 | Jones .................... | G01C 21/20 |
| 2020/0302510 A1* | 9/2020 | Chachek ................ | G06V 20/52 |
| 2020/0379567 A1* | 12/2020 | Muller, III .............. | G06F 3/016 |
| 2021/0157665 A1* | 5/2021 | Rallapalli ........... | G06F 11/3068 |
| 2021/0358314 A1* | 11/2021 | Hwu .................... | G08G 5/0013 |
| 2022/0051076 A1* | 2/2022 | Bingham ............... | G06N 3/086 |
| 2022/0329917 A1* | 10/2022 | Karafin .................. | G06N 3/045 |
| 2022/0349716 A1 | 11/2022 | Rachedi et al. | |
| 2024/0001196 A1* | 1/2024 | Yip ....................... | G06N 3/0464 |
| 2024/0054906 A1* | 2/2024 | Du .......................... | G06T 13/80 |
| 2024/0086688 A1* | 3/2024 | Rieder .................. | G06N 3/044 |
| 2024/0130922 A1* | 4/2024 | Kong ..................... | G06F 1/163 |

FOREIGN PATENT DOCUMENTS

| | | |
|---|---|---|
| CN | 112396018 A | 2/2021 |
| EP | 1876089 A2 | 1/2008 |
| EP | 3502858 A1 | 6/2019 |
| IN | 201811030218 A | 2/2020 |
| JP | 2016508455 A | 3/2016 |
| WO | 2011042049 A1 | 4/2011 |

OTHER PUBLICATIONS

Moreno, GA, "Creating Custom Containers with Generative Techniques," In Proceedings of the 5th International Conference on Generative Programming and Component Engineering, Oct. 22, 2006, pp. 29-38.

Traylor, RM et al., "Design considerations for stand-alone haptic interfaces communicating via UDP protocol," In First Joint Eurohaptics Conference and Symposium on Haptic Interfaces for Virtual Environment and Teleoperator Systems, World Haptics Conference, Mar. 1, 20058, pp. 563-564, IEEE.

Louie, R. et al., "Expressive Communication: Evaluating Developments in Generative Models and Steering Interfaces for Music Creation, "In 27th International Conference on Intelligent User Interfaces Mar. 22, 2022, pp. 405-417.

Louie, R. et al., "Novice-AI music co-creation via AI-steering tools for deep generative models," In Proceedings of the 2020 CHI Conference on Human Factors in Computing Systems, Apr. 21, 2020, pp. 1-13.

Campion, G. et al., "Passive viscous haptic textures," In 2008 Symposium on Haptic Interfaces for Virtual Environment and Teleoperator Systems, Mar. 13, 2008, pp. 379-380, IEEE.

Mell, P. et al., The NIST Definition of Cloud Computing, National Institute of Standards and Technology, U.S. Dept. of Commerce, Special Publication 800-145, Sep. 2011, 7 pg.

Zheng, X. et al., "DAGS with No Tears: Continuous optimization for structure learning," Advances in Neural Information Processing Systems 31, NeurIPS 2018, Dec. 3-8, 2018, 12 pg.

\* cited by examiner

GENERATIVE ARTIFICIAL INTELLIGENCE SYSTEM FOR CREATING MOVEMENT IN A PHYSICAL ENVIRONMENT

BACKGROUND

This disclosure relates to creating movement in a physical environment using a generative artificial intelligence system.

A variety of different digital environments exist with which users may interact. These digital environments may include, but are not limited to, video games, computer-based simulations, virtual reality environments, and augmented reality environments. Often, the digital environments model a real-world counterpart. Within such digital environments, users may explore different features, locations, and events of the digital environment and do so with fewer constraints compared to the real-world counterpart of the digital environment. For example, users may instantly move from one location in the digital environment to another location unconstrained by physical distance or terrain, users may instantly shift forward in time, shift backward in time, replay the same event, replay different events, serially observe events that occur concurrently or simultaneously in the real-world counterpart, and/or change any of a variety of other user-related or environment-related features.

Within the real-world counterpart of the digital environment, referred to as the physical environment or physical counterpart, the user is significantly more constrained. The user must make decisions as to where to be, when to be there, and what to view. Each decision has an influence on the user's future decisions and opportunities to interact with the physical environment. In cases where the physical environment is very large or complex, one can readily see that the user's prior decisions as to where to be, when to be there, and what to view limit the user's future opportunities to interact with the physical environment.

SUMMARY

In one or more embodiments, a method includes extracting, by computer hardware, digital features from interactions of a user with a digital environment that models a physical environment. The method includes extracting, by the computer hardware, physical features from sensor data generated from detected interactions of the user with the physical environment. The method includes generating, by the computer hardware, a recommendation for the user within the physical environment based on a correlation of the digital features with the physical features. The method includes providing the recommendation to the user.

The foregoing and other implementations can each optionally include one or more of the following features, alone or in combination. Some example implementations include all the following features in combination.

In some aspects, providing the recommendation includes generating haptic signals by decoding, using a decoder stage executed by the computer hardware, the physical features and the recommendation. The haptic signals may specify a movement of the user within the physical environment in furtherance of the recommendation.

In some aspects, the method includes encoding, using an encoder stage executed by the computer hardware, the digital features to generate encoded data. The encoded data is provided to the decoder stage.

In some aspects, the method includes providing the haptic signals to a haptic device of the user.

In some aspects, the method includes dynamically selecting different activation functions for use with the encoder stage and the decoder stage over time.

In some aspects, the different activation functions are selected based on at least one of a selected digital feature or a selected physical feature having a minimum correlation with one or more other digital features, physical features, or both digital and physical features.

In some aspects, the method includes generating a log of the interactions of the user with the digital environment, wherein the digital features are extracted from the log.

In some aspects, the method includes generating a causation model based on the digital features.

In some aspects, the recommendation is generated by matching a context defined by the physical features as extracted with a portion of the causation model.

In one or more embodiments, a system includes one or more processors configured to perform executable operations as described within this disclosure.

In one or more embodiments, a computer program product includes a computer readable storage medium having program instructions stored thereon. The program instructions are executable by one or more processors to cause the one or more processors to execute operations as described within this disclosure.

This Summary section is provided merely to introduce certain concepts and not to identify any key or essential features of the claimed subject matter. Other features of the inventive arrangements will be apparent from the accompanying drawings and from the following detailed description.

DETAILED DESCRIPTION

Figure 1:
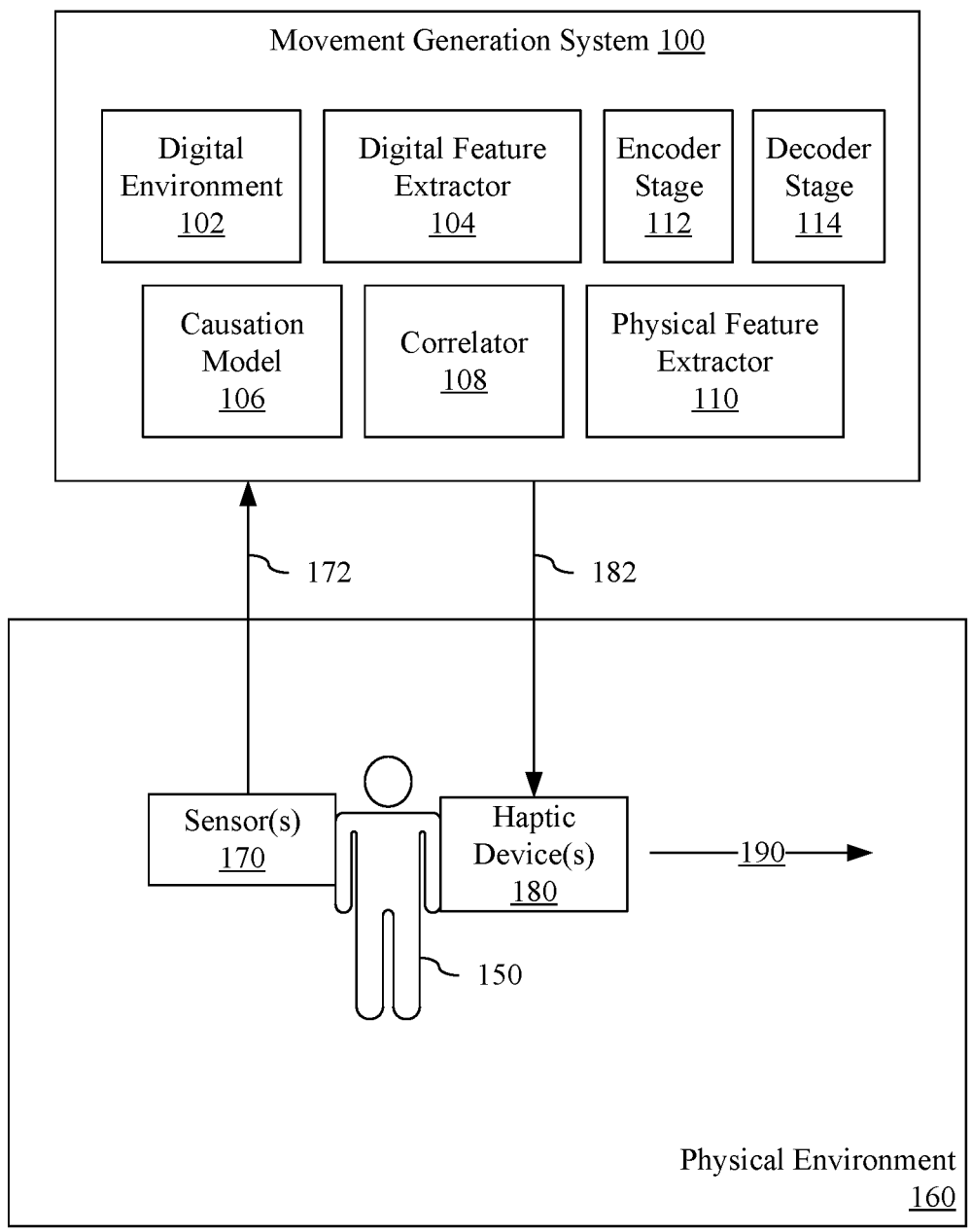
FIG. 1 is a block diagram illustrating an example of a movement generation system (MGS).

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to creating movement in a physical environment using generative artificial intelligence systems. In accordance with the inventive arrangements, methods, systems, and computer program products are provided that predict one or more future actions of a user operating within, or interacting with, a physical environment based on interactions of the user with a digital environment that models the physical environment. The predicted action is also referred to herein as a recommendation. The recommendation may be provided to the user. In one or more examples, direction information may be provided to the user as the recommendation and/or as part of the recommendation. In one or more examples, the direction information may be provided to the user as haptic data. The haptic data may be provided to a haptic device of the user in the physical environment to guide the user within or through the physical environment in accordance with, or in furtherance of, the predicted action or recommendation.

In one or more examples, a system is capable of obtaining or logging user interactions with a digital environment. The user interactions are analyzed to extract particular digital features of the user's interaction with the digital environment. The digital features, as extracted, specify different interests of the user pertaining to the digital environment and causally relate to the user's actions within the digital environment. Based on the extracted digital features, the system is capable of predicting a future action of the user in the physical environment. In some examples, the system utilizes the digital features in combination with physical features extracted or derived from the user's interactions or participation in the physical environment in generating the recommendation.

For example, the system is capable of predicting a path that the user should take or direction of movement for the user, at particular times, in the physical environment based on decisions made by the user in the digital environment. The path may be specified to the user as one or more, e.g., a series, of recommendations specifying predicted and/or ordered actions and/or movements. As noted, in some examples, each predicted action, or recommendation, may be provided to the user in the form of haptic data. The system is capable of generating haptic data that can be provided to a haptic device of the user. The haptic data, as interpreted by the haptic device, informs the user of the predicted action. The haptic device, responsive to the haptic data, may stimulate the user to move. The movement, as stimulated by the haptic device, may be a particular movement, movement in a particular direction, movement of a particular part or appendage of the user's body, or the like, in conformance with, or furtherance of, the recommendation.

In one or more examples, the inventive arrangements are capable of providing technological improvements to real-time interaction between a digital environment and a physical environment, technological improvements to the operation of an encoder stage and a decoder stage in a machine-learning and/or artificial intelligence-based system, and technological improvements to the use and operation of one or more haptic devices in communication with the inventive arrangements. Interactions between a user and a digital environment may be evaluated on a real-time basis and in an iterative manner to generate and convey recommendations, including haptic feedback data, to a user device in the physical environment. The inventive arrangements integrate an encoder stage and a decoder stage with causation model(s) so that both the digital environment and the physical environment are linked by way of a data processing pipeline including the causation model(s). Thus, both environments are able to adapt to user actions occurring in the digital environment and/or the physical environment. The encoder stage encodes data generated by the data processing pipeline and feeds the encoded data back to the digital environment influencing the digital environment and the digital features extracted therefrom that are fed back into the data processing pipeline. The decoder stage decodes data from the data processing pipeline to provide haptic data to haptic device(s) of the user.

As the system is operative in real time and may be trained and/or continue to evolve (e.g., learn) for operation with particular haptic devices of the user, the system is able to provide more complex and detailed haptic feedback to the haptic devices by way of the control mechanisms (e.g., the data processing pipeline and decoder stage) that reacts in real-time and/or near real-time to user actions in the digital environment and/or the physical environment. Operation of the system in communication with the haptic device(s), as facilitated by the data processing pipeline operating with the encoder stage and/or the decoder stage, provides improved operation of the haptic device(s) which may include increased control over the haptic device(s), improved configuration of the haptic device(s), and improved dynamic control over the haptic devices.

Within this disclosure, the term "digital environment" means a digital model of a portion of the real or physical world and a corresponding scenario (real or imagined/created) with which one or more users are able to interact. The portion of the real world modeled by the digital environment is referred to herein as the "physical environment" or the "physical counterpart." Examples of a digital environment include, but are not limited to, a video game, a computer-based simulation, a computer-based re-creation, a virtual reality environment, an augmented reality environment, and a mixed-reality environment. The digital environment may model an actual portion or region of the real world and model a particular scenario occurring in that modeled region.

Within this disclosure, for ease of illustration and purposes of discussion, a golf tournament taking place on a golf course is used as an example of a physical environment with the digital environment being a model of that golf tournament and golf course. It should be appreciated that any of a variety of different portions and/or events of the real-world may serve as the physical environment with the digital environment being a model thereof. Other examples of a physical environment upon which a digital environment may be created may include, but are not limited to, a city, a town, another outdoor venue and/or geographic region, a building or other structure such as a stadium or airport, or the like. Other scenarios that may take place at or in the physical environment may include sporting events, travel seasons, gatherings, disturbances or conflicts (e.g., civic or otherwise), etc. In this regard, the inventive arrangements are not intended to be limited to the particular example(s) of digital environments and/or physical environments described herein.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 is a block diagram illustrating an example of a movement generation system (MGS) 100. In the example of FIG. 1, MGS 100 may be implemented as one or more interconnected data processing systems executing program code. As shown, MGS 100 includes a digital environment 102, a digital feature extractor 104, a causation model 106, a correlator 108, a physical feature extractor 110, an encoder stage 112, a decoder stage 114, and a regressor 116. Digital environment 102 is a digital model of a physical environment 160.

In the example, a user 150 is within, e.g., interacting with and/or participating in, physical environment 160. Physical environment 160 is the real-world or physical counterpart modeled by digital environment 102. One or more sensors 170 may be used and/or worn by user 150. Sensor(s) 170 are capable of tracking physical features such as motion, direction, acceleration in multiple degrees, and/or location of user 150, each with respect to time, within physical environment 160. Examples of sensor(s) 170 can include, but are not limited to, a global positioning sensor (GPS), wireless receiver/transceivers, accelerometers, inertial measurement units (IMUs), or any of a variety of other devices. Sensors capable of detecting location, motion, direction, and/or acceleration may be disposed within one or more end user devices (e.g., end user device 603 of FIG. 6) which may include, but is not limited to, a mobile phone, a smart watch, smart glasses, earphones or headphones, or other electronic device(s). Sensor(s) 170 are capable generating sensor data 172 that may be conveyed to MGS 100 (e.g., by way of the device in which sensor(s) 170 are disposed and/or other intervening devices and/or communication systems whether wireless or wired). Sensor data 172 may specify location information, motion information, direction information, and/or acceleration information for user 150 as user 150 interacts with physical environment 160. Any information provided as sensor data 172 from sensor(s) 170 to MGS 100 may be timestamped.

User 150 also may have and/or wear one or more haptic devices 180. Haptic device(s) 180 are capable of receiving haptic data 182 from MGS 100. Haptic data 182 may be conveyed from MGS 100 to haptic device(s) 180 by way of the device in which haptic device(s) 180 are disposed and/or other intervening devices and/or communication systems whether wireless or wired. Haptic device(s) 180 are capable of interpreting haptic data 182 to generate haptic feedback to user 150. In one or more embodiments, the haptic data 182 is configuration data that is suited to configure and/or control the particular haptic device(s) 180 used by user 150. The haptic feedback suggests particular movement to user 150. The suggested movement may be a suggested movement of user 150's body, movement of a particular limb/appendage of user 150's body, and/or movement in a particular direction within physical environment 160.

Examples of haptic devices may include any of a variety of devices that may be worn and/or carried by user 150. For purposes of illustration and not limitation, haptic device(s) 180 may be implemented as, or disposed in, an end user device such as end user device 603 of FIG. 6 which may include, but is not limited to, a mobile phone, a smartwatch, a haptic glove, haptic wristband, or other electronic device including one or more tactile sensors, servos, transducers, actuators, or other mechanisms capable of providing or generating haptic feedback. In some examples, haptic device 180 may include an electrode that is responsive to haptic data 182 to provide electrode-based stimulation to user 150 to facilitate automatic muscle movement based on movements and calculated trajectory generated by MGS 100. In some examples, sensor(s) 170 and haptic device(s) 180 may be disposed in a same electronic device (e.g., a same end user device 603). In other examples, sensor(s) 170 and haptic device(s) 180 may be disposed in different electronic devices (e.g., one or more different end user devices 603).

In one or more embodiments, haptic device(s) 180 may execute suitable software such as a client application that receives haptic data 182 and controls operation of the particular tactile sensors, servos, transducers, actuators, or other mechanisms within haptic device(s) 180 to generate physical feedback for user 150.

For purposes of illustration, physical environment 160 is a golf course hosting a professional golf tournament as the scenario. The golf course may be a large, multi-acre setting in which user 150 may interact. Digital environment 102 is a model of physical environment 160. User 150 may interact with digital environment 102 prior to, or concurrently with, interacting with physical environment 160. For example, through digital environment 102, user 150 may interact with any hole on the digital golf course, view and/or interact with any of a variety of different digital renderings of professional golfers playing on the digital golf course, view a simulation of each professional golfer playing each hole, re-watch particular events of interest that have occurred in the tournament taking place in the real-world, and/or re-watch particular events of past tournaments at the golf course (e.g., eagles, shots, etc.), or the like. In interacting with digital environment 102, user 150 is not constrained by having to navigate the large geographic area of physical environment 160 and is not limited by the time constraints that exist in physical environment 160. User 150 may rewatch particular moments of the simulated golf tournament and/or past golf tournaments from different vantage points (e.g., locations) in digital environment 102.

Digital feature extractor 104 is capable of extracting features of the interactions of user 150 with digital environment 102 (e.g., digital features). Examples of digital features extracted from user interactions with digital environment 102 may include, but are not limited to, location of the user in digital environment 102 (e.g., a particular hole or area or region of the hole), particular players watched and where, particular events watched (e.g., eagles, birdies, holes-in-one), and/or the amount of time spent watching these various events (e.g., amount of time spent watching different holes, events, and/or players in digital environment 102), which may be referred to herein as "dwell time." Other features such as the location of the ball in consequence of shots observed by user 150 also may be extracted as digital features. Each digital feature, as extracted, may be considered a digital variable that may be used to specify a level of interest of the user in the events occurring within digital environment 102. Each feature may be extracted with a dwell time. Tens, hundreds, or more digital features may be extracted.

Physical feature extractor 110 is capable of extracting physical features from physical environment 160. In the example, physical feature extractor 110 may receive sensor data 172 generated by sensor(s) 170. From sensor data 172, physical feature extractor 110 is capable of extracting particular physical features. The physical features may include the location of user 150 within physical environment 160, dwell time of user 150 at particular locations, and/or dwell time for watching particular events and/or players (e.g., in being involved in certain events and/or at particular locations) within physical environment 160. Physical feature extractor 110 also may receive additional contextual information for physical environment 160 from other external sources from which physical features may be extracted. Such additional contextual information may include contextual information pertaining to physical environment 160 that is not specific to user 150. Such information may include events occurring in physical environment 160 at different locations therein, which players are located at which holes and where at each respective hole, current scores of players, and the like. Physical features, as extracted, may be time-stamped like the digital features. Tens, hundreds, or more physical features may be extracted and used as physical variables. In one or more examples, one or more or all of the physical features extracted may be versions of the digital features that are extracted.

MGS 100 uses the digital features to generate causation model 106. Causation model 106 may be used to correlate or match the digital features with the physical features. In one or more example implementations, causation model 106 is specified as a directed acyclic graph (DAG). Correlator 108 may be used to generate recommendations (e.g., predicted actions) for user 150 for a given moment in time (e.g., in real time) or for a given window or period of time (e.g., in the near future) within physical environment 160 given causation model 106 and extracted physical features. For example, correlator 108 may generate one or more recommendations for user 150 by correlating extracted physical features with portions of causation model 106. In one or more embodiments, correlator 108 is included as part of a data processing pipeline that is capable of operating with encoder stage 112 and/or decoder stage 114. Causation model 106 may be included and/or used as part of the data processing pipeline.

Encoder stage 112 receives the digital features extracted from digital environment 102. Encoder stage 112 may encode the received information to generate encoded data (e.g., feature vectors). Decoder stage 114 receives the physical features as extracted from physical environment 160 and recommendation(s) from causation model 106. In one or more alternative embodiments, the encoded data may be provided to decoder stage 114 with the physical features as extracted from physical environment 160 and recommendation(s).

In one or more examples, decoder stage 114 may be implemented as a generative Artificial Intelligence (AI) system that generates haptic data 182 as output. That is, based on the received input, e.g., physical features and recommendation(s), decoder stage 114 is capable of generating haptic data 182. In one or more alternative embodiments, decoder stage 114 also utilizes the encoded information from encoder stage 112, if provided, in generating haptic data 182. Haptic data 182, as interpreted by haptic device 180, specify or suggest movement to user 150 in accordance with, or in furtherance of, the recommendation.

For example, encoder stage 112 may be trained to encode the digital features into a vector space specified as the encoded data. Decoder stage 114 may be trained to decode a particular context for user 150 as defined by the extracted physical features and given one or more recommendations. The physical features may specify a current location of the user in physical environment 160, for example. Decoder stage 114 is capable of generating haptic data 182 that directs user 150 in a particular direction or specify a particular movement to be performed to move user 150 toward or in the direction of the recommendation. Haptic data 182, generated by decoder stage 114 and interpreted by haptic device(s) 180, induce movement of user 150 toward or in furtherance of the recommendation. In this manner, haptic data 182 specify a particular recommendation by MGS 100, at least indirectly, by virtue of the motion induced or suggested by interpretation of that data by haptic device(s) 180.

The recommendation, for example, may be to move to a different location at the same hole or move to a different hole altogether to view a particular event. The event may be a golfer liked by user 150 playing the hole or playing at a location to which user 150 is directed. Other examples of recommendations may include moving to a different hole to follow a particular golfer, to move to a different location to follow a ball played by a particular golfer, etc. In the example of FIG. 1, haptic device 180 provides haptic feedback to user 150 indicating that the user should move within physical environment 160 in the direction illustrated by arrow 190 (e.g., the recommendation).

In another example, decoder stage 114 may be trained to decode the encoded data given a particular context for user 150 as defined by the extracted physical features and given one or more recommendations. Decoder stage 114 may also be trained as to the particular haptic device(s) 180 used by user 150. In still one or more other embodiments, decoder stage 114 may include additional networks capable of decoding the encoded data from encoder stage 112 into human readable form such as text, images, or other instructions specifying the recommendation. As an illustrative and non-limiting example, encoded data may be decoded to provide supplemental information that explains or describes the haptic data 182 provided to the user. That is, the human readable information generated from the encoded data may be provided concurrently or simultaneously with haptic data 182 to provide the user with additional information to understand the purpose of the haptic data 182. In some examples, the human readable information generated from the encoded data may be provided to a parallel or other digital device of the user (a device other than the haptic feedback device). For example, while the haptic data 182 indicates to move in a particular direction, the human readable data may say or indicate "the haptic device is directing you to hold number 5."

In one or more examples, the recommendation may be provided directly to the user (e.g., user device) from regressor 212 (e.g., bypassing decoder stage 114). The recommendation may specify the actual predicted action of the user. In one or more examples, the recommendation may also include directional data such as textual directions instructing the user where to go or what to do in furtherance of the predicted action. In some examples, the recommendation may indicate that the user "walk" in a particular direction so that the user is "moved" or prompted to move in a particular direction at a particular time in accordance with the recommendation. In such examples, haptic data 182 may be omitted or not provided. In still other examples, however, haptic data 182, as generated by decoder stage 114, may be provided with the recommendation or with the recommendation and other instructions (e.g., textual or otherwise).

In the embodiments described herein, encoder stage 112 and decoder stage 114 are interleaved in terms of their respective contexts. That is, encoder stage 112 is configured to encode digital features corresponding to digital environment 102. Decoder stage 114 is configured to decode information, which may include encoded information pertaining to digital environment 102 in some embodiments, for use in physical environment 160. The decoding of information for use in physical environment 160 using the physical features, for example, allows digital features such as dwell time for user 150 in a particular location in digital environment 102 to be translated into a recommendation specifying a path to be traversed by user 150 in physical environment 160.

As an illustrative and non-limiting example, information indicating that user 150 spent time at hole 1 in digital environment 102 may be encoded into encoded information and used to generate recommendation that may be decoded into haptic data 182 guiding user 150 in the direction of arrow 190 to hole 1 in physical environment 160 based on the user 150's current location in physical environment 160 and optionally other contextual information from physical environment 160 (e.g., physical features extracted from the sensor data and/or from other external sources of contextual data). The recommendation to move to hole 1 may be based on items determined to be of interest to the user from the digital features (e.g., a golfer of interest to the user playing hole 1).

Figure 2:
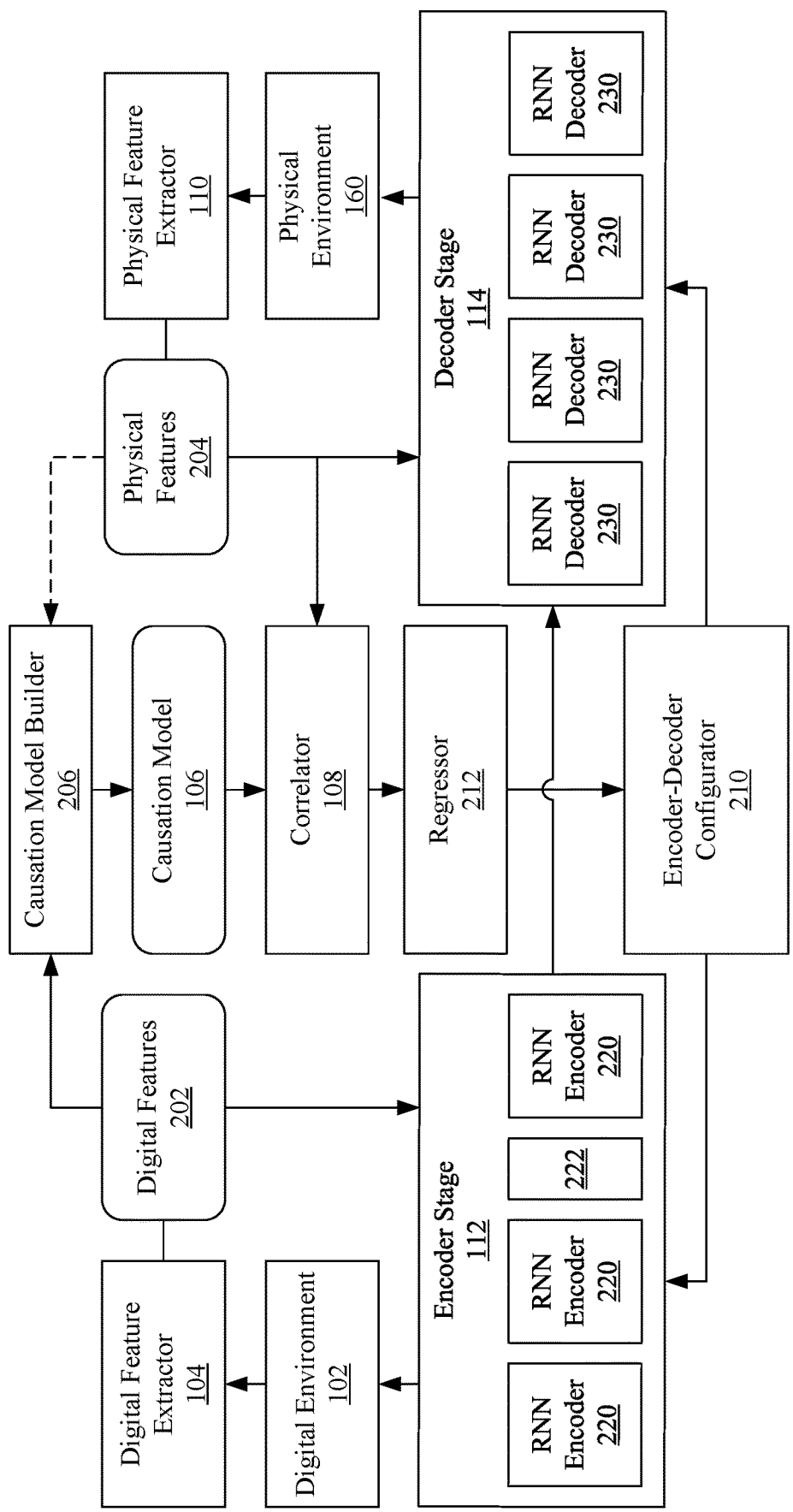
FIG. 2 is a block diagram illustrating an example architecture for an MGS.

FIG. 2 is a block diagram illustrating an example architecture for MGS 100 of FIG. 1. The example architecture of FIG. 2 may be executed by a data processing system to perform the various operations described herein. An example of a data processing system is described herein in connection with FIG. 6.

Figure 3:
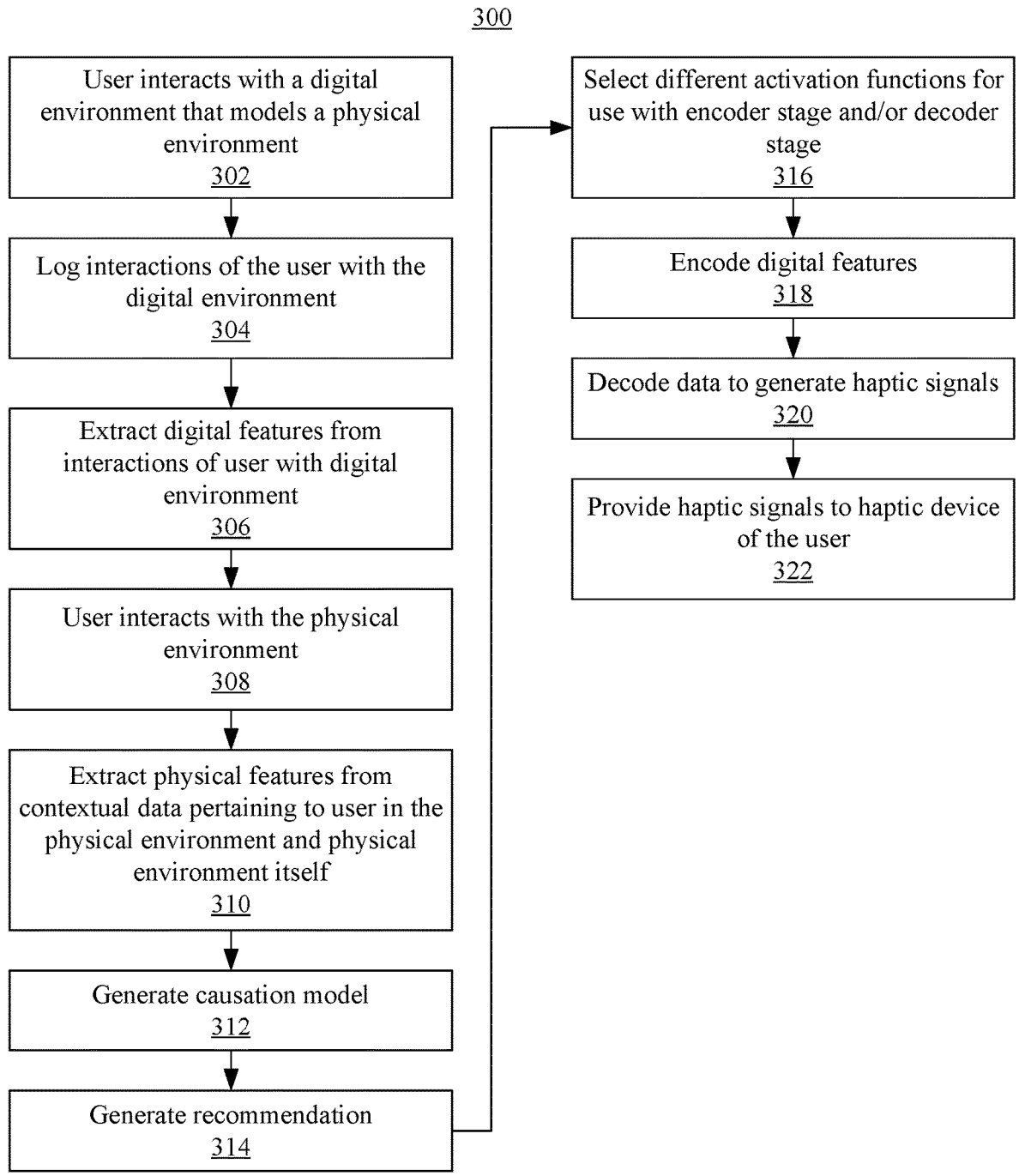
FIG. 3 is a flow chart illustrating an example method of operation for the MGS.

FIG. 3 is a flow chart illustrating an example method 300 of operation for MGS 100. Referring to FIGS. 2 and 3, in block 302, user 150 interacts with digital environment 102. Digital environment 102 models physical environment 160. As discussed, user 150 may interact with digital environment 102 concurrently with physical environment 160 and/or interact with digital environment 102 prior to interacting with physical environment 160.

In block 304, interactions of user 150 with digital environment 102 may be logged. For example, digital feature extractor 104 may log user 150's interactions with digital environment 102. The log, for example, may specify different inputs provided from user 150 to digital environment 102, other state data of digital environment 102 at the time that user 150 provides such input thereto, and the states that result from such inputs. In block 306, digital feature extractor 104 extracts digital features 202 from the interactions (e.g., as logged) of user 150 with digital environment 102. The digital features 202, for example, may be digital variables derived from the logged interactions. In one or more examples, dwell time for the different digital features 202 as extracted may be included.

In block 308, user 150 interacts with physical environment 160. In one or more aspects, sensor data 172 generated by sensor(s) 170 may be provided to physical feature extractor 110. In one or more other examples, additional contextual data pertaining to physical environment 160 may be provided to physical feature extractor 110. Such other contextual data may include, but is not limited to, the location of golfers on the golf course, the occurrence of particular events and locations thereof, the location of golf balls as played by the golfers, etc. Such information may be continually provided in real time or in near real time as may be sensor data 172 pertaining to user 150.

In block 310, physical feature extractor 110 extracts physical features 204 from the sensor data 172 received pertaining to user 150 within physical environment 160 and from contextual data pertaining to physical environment 160 itself (e.g., contextual data that is independent of user 150). Examples of physical features 204 include, but are not limited to, the location of user 150 in physical environment 160, what user 150 is doing (e.g., walking in a particular direction, standing still), whether user 150 has been through or traversed a particular path within physical environment 160 already, what haptic devices 180 are available for user 150, locations of other golfers in physical environment 160, and/or events that have occurred in physical environment 160.

Referring to FIG. 2, digital features 202 are provided to encoder stage 112 and to causation model builder 206. Physical features 204 are provided to decoder stage 114 and to correlator 108. In block 312, causation model builder 206 builds causation model 106 using digital features 202. As discussed, causation model 106 may be implemented as a DAG. In one or more embodiments, causation model 106 is built using the "NO TEARS" technique as generally known and described in Zhen, et al., "DAGs with NO TEARS: Continuous Optimization for Structure Learning," arXiv: 1803.01422 (2018). In one or more other embodiments, causation model builder 206 may build causation model 106 using both digital features 202 and physical features 204.

In general, causation model 106 establishes relationships. Causation model 106 may, for example, indicate that the user is interested in golfer A and, as such will likely watch golfer A. This may be specified by the edges or links of the DAG based, at least in part, on dwell time for the various digital features 202 as extracted. As an example, the dwell time of the user watching golfer A in digital environment 102 may be high (e.g., above a threshold) or non-zero thereby indicating a level of interest that may be used to establish a link in the DAG between the digital feature (the user watching golfer A in digital environment 102) and a physical feature (e.g., the user watching golfer A in physical environment 160). Such information is instructive in that the user's path in physical environment 160 is likely to have a correlation to the path of golfer A in physical environment 160.

In block 314, correlator 108 is capable of generating one or more recommendations. In one or more embodiments, correlator 108 is capable of generating a correlation matrix and/or an adjacency matrix. The adjacency matrix is the representation of the network edges. Regarding the correlation matrix, each intersection of a feature of a row (x) and a feature (y) of a column of the correlation matrix represents a correlation between the feature of the row and the feature of the column. Each intersection specifies a correlation between feature x and feature y.

In the example, the correlation matrix is a mixture of digital features 202 and physical features 204. For example, both digital features and physical features are specified along the row and along the columns such that a correlation, determined using known or existing techniques, is specified for each feature, both physical and digital, with respect to each other feature both physical and digital. For those row features and column features that have a zero value at the intersection, the two features are uncorrelated. For those row features and column features that do have a non-zero value, the two features have a correlation that may be positive or negative. The degree of correlation may be expressed as a numerical value, as deeper or more intense color, etc. In one or more embodiments, the correlation matrix and/or adjacency matrix may be provided to encoder-decoder configurator 210.

In one or more embodiments, causation model 106 is provided to correlator 108 with physical features 204. Correlator 108 is capable of receiving physical features 204, which specify a particular scenario or context that is occurring in physical environment 160. Correlator 108 is capable of searching causation model 106 for a scenario from digital environment 102, as expressed by causation model 106, that matches, or is correlated with, the scenario of physical environment 160. By matching the context of what is occurring in physical environment 160, as specified by physical features 204, with a scenario from digital environment 102 specified within causation model 106, correlator 108 is capable of measuring the correlation between one or more variables of interest in digital features 202 and corresponding variables of physical features 204 so long as a cause-and-effect relationship exists in causation model 106. Correlator 108, for example, is capable of determining a correlation magnitude and variation between digital environment 102 and physical feature extractor 110 to select an action from causation model 106 (e.g., a next node in the DAG given a matched node or location) as the recommendation for user 150. The next node may be selected based on correlations specified by the correlation matrix.

MGS 100 is capable of using causal relations between input features and interest levels to correlate a combination of input features with highest interest spread. The interest spread specifies a causal relation between the input features to determine what is causing higher interest in certain areas. An example is determining the particular feature causing higher interest such as the player, the hole, the shot type (e.g., putt, drive, etc.), or the like. This identification of causation relation helps identify what the user is interested in and may be used to generate recommendations.

In matching a context of user 150 within physical environment 160 with a location in causation model 106, correlator 108 is capable of generating a recommendation for user 150. That is, correlator 108 is capable of using causal relationships between input features (e.g., physical features 204) and causation model 106 to generate the recommendation, which correlates a combination of the input features with a recommendation having a highest interest for the user. In one or more embodiments, correlations generated by correlator 108 are provided to encoder-decoder configurator 210. The recommendation generated by correlator 108 may be provided to decoder stage 114. The recommendation generated by correlator 108 also may be provided to encoder stage 112. In one or more examples, the recommendation may flow through the data processing pipeline including causation model builder 206, causation model 106, correlator 108, regressor 212, and encoder-decoder configurator 210 to each of encoder stage 112 and decoder stage 114. With reference to the data processing pipeline, data generated by the respective components may flow through subsequent components so as to be available to any downstream components coupled to the data processing pipeline. In other embodiments, correlator 108 may provide the recommendation directly to encoder stage 112 and to decoder stage 114 (not shown).

For purposes of illustration, consider an example in which, for a given event, pertinent digital features for digital environment 102 are [0.1, 0.6, 0.03, . . . ] and the pertinent physical features are [0.04, 0.002, 0.05, . . . ]. The correlation matrix is evaluated to be [0.04, −0.02, 0.08, . . . ]. In this example, the set with the highest correlation is selected with the relevant environment variable and physical feature being looped back to the causation model. Based on the output from the causation model, e.g., the recommendation, haptic data may be generated.

In block 316, different activation functions for use with encoder stage 112 and/or decoder stage 114 are selected. In the example of FIG. 2, correlation data generated by correlator 108 is provided to regressor 212. Regressor 212 may be implemented as a multivariate, multiple regressor capable of generating a model. The model, for example, may specify a curve fitted to those features determined to be causal based on the correlation matrix. In one or more example implementations, the model, as generated by regressor 212, is provided to encoder-decoder configurator 210.

Encoder-decoder configurator 210 is capable of selecting one or more activation functions that may be used by encoder stage 112 and/or decoder stage 114. Encoder-decoder configurator 210 may change one or more of the activation function(s) used by encoder stage 112 and/or decoder stage 114 dynamically over time. One or more of the activation functions may be changed for encoder stage 112 and/or decoder stage 114 on a per-iteration basis and/or a per-task basis. In some aspects, the different activation functions that are selected for use in a given iteration are selected based on at least one of a selected digital feature or a selected physical feature having a minimum correlation with one or more other digital features, physical features, or both digital and physical features. In other examples, the selection of particular activation functions may be based on the task that is to be performed by decoder stage 114. For example, a probability-based task may use a first activation function (e.g., Sigmoid), while a classification task may utilize a different activation function.

In one or more embodiments, encoder-decoder configurator 210 breaks the encodings generated by encoder stage 112 into N different segments or quantiles. The value of N may be set equal to the number of different activation functions available for use by encoder stage 112 and/or decoder stage 114. Encoder-decoder configurator 210, for example, is capable of selecting N different (e.g., unique) activation functions and assigning one of the N activation functions to each quantile of the input data for encoder stage 112 (e.g., a different activation function to each quantile) and assigning one of the N activation functions to each quantile of input data for decoder stage 114 (e.g., a different activation function to each quantile). In another example, encoder-decoder configurator 210 is capable of subdividing the encodings of encoder stage 112 and the decodings of decoder stage 114 each into N/2 different segments or quantiles and assign one activation function to each different segment or quantile across both encoder stage 112 and decoder stage 114 (e.g., so that no activation function is assigned to more than one quantile). As an illustrative and non-limiting example where N=4, encoder-decoder configurator 210 is capable of assigning a first activation function N1 to a first half of the encodings, a second and different activation function N2 to the second half of the encodings, a third and different activation function N3 to the first half of the decodings, and a fourth and different activation function N4 to the second half of the decodings.

For example, with four different activation functions (e.g., N=4), a total of 4! (e.g., 24) combinations of activation functions is possible. Examples of the different types of activation functions that may be used for the different quartiles, in reference to each half of the encodings and each half of the decodings, may include, but are not limited to, the hyperbolic tangent (tanh) function, the sigmoid function, the Rectified Linear Unit (ReLU) function, the Maxout function, the Exponential Linear Unit (ELU) function, the Softmax function, and the Leaky ReLU function. The different activation functions provide different benefits to the encoder stage 112 and/or decoder stage 114. For example, the spread of a tanh function maintains more variation of scores that are combined together while the ReLU function has less variation. The selection of a particular activation function for use by encoder stage 112 and/or decoder stage 114 helps to relate the variables to the interest level of the user in different features of physical environment 160 with more or less spread.

In one or more embodiments, encoder-decoder configurator 210 is capable of selecting activation functions based on the relation of the respective activation functions to the causation variables between the digital environment 102 and physical environment 160. The causation variables are obtained from the correlation matrix. In one or more embodiments, the causation variables (e.g., those with a correlation above a threshold or the top X variables ordered in decreasing correlation) may be provided directly to encoder-decoder configurator 210. In one or more other embodiments, the model generated by regressor 212 may be provided to encoder-decoder configurator 210, where the model specifies a function of the causation variables.

In one or more examples, the activation functions may be selected depending on the problem type (e.g., task) and the value range of the expected output. As an illustrative and non-limiting example, in response to the expected output value range of (0, 1) and the input being $(-\mu, \mu)$, encoder-decoder configurator 210 selects the Sigmoid activation function. In response to the expected output value being in the range $(-1, 1)$ with the input being $(-\mu, \mu)$, encoder-decoder configurator 210 selects the tanh activation function. In response to the predicted output being larger than 1 with the input being $(-\mu, \mu)$, encoder-decoder configurator 210 selects ReLU in the output layer. In the case of a classification task with neural networks to predict probability distribution, encoder-decoder configurator 210 may select Softmax activation function as the preferred choice for the output layer while selecting ReLU for hidden layers. In some embodiments, the particular task performed and values used may change during runtime based on a selection of the top X variables used and/or provided to the encoder stage 112 and/or decoder stage 114.

For example, as the process iterates and encoder stage 112 and decoder stage 114 iterate, the variables (e.g., features) change from one iteration to the next. Some variables may no longer work with particular activation function(s). Each activation function helps encoder stage 112 and/or decoder stage 114 learn a different type of information and may block different types of information. By choosing different activation function(s) over time, the system is capable of determining a maximum interest level and capable of extracting a greater amount of information from the same features. For example, by using the sigmoid activation function in a first iteration and then using ReLU in a second iteration (or splitting the data so that sigmoid is used for the first half and ReLU for the second half), increased variability may be achieved. In some example implementations, the amount of data available for training encoder stage 112 and/or decoder stage 114 may be used to set or restrict the number of activation functions used (e.g., the number N). That is, with less training data available, N may be set lower compared to situations with a greater amount of training data available where N may be set to a larger value (use more activation functions). In one or more embodiments, the output from regressor 212 may be evaluated as the value(s) to determine or select the particular activation function(s) to be used. In one or more embodiments, for example, the output of regressor 212 also may be provided to encoder stage 112 and incorporated int the encoded data generated by encoder stage 112. Encoder-decoder configurator 210 may be configured to change or dynamically modify the activation function used for individual layers, e.g., the first layer, the penultimate layer, or the last layer of encoder stage 112 and/or decoder stage 114. Encoder-decoder configurator 210, for example, may evaluate the value(s) provided as input to one or more or all or each layer and adjust/change the activation function used in that layer based on the input values provided to the nodes thereof at that moment in time dynamically.

As illustrated in FIG. 2, encoder stage 112 receives digital features 202 as extracted from digital feature extractor 104. In the example, encoder stage 112 is implemented using one or more Recurrent Neural Network (RNN) Encoders 220 (e.g., one or more stacked RNNs). Encoder stage 112 may include one or more hidden layers 222. Decoder stage 114 may include one or more RNN decoders 230 (e.g., one or more stacked RNNs). In general, an RNN is a type of artificial neural network which uses sequential data or time series data. The RNN is a type of deep learning algorithm commonly used for ordinal or temporal problems, such as language translation, natural language processing (NLP), speech recognition, and image captioning. An RNN has "memory" as the RNN takes information from prior inputs to influence the current input and output.

In the example, encoder stage 112 in combination with decoder stage 114 is performing a translation of digital features 202 to real-world motion. In block 318, encoder stage 112 encodes digital features 202. Encoder stage 112 is trained to encode digital features 202 into a vector space to generate encoded data. In the example, the encoded features may be provided to digital environment 102. The encoded features may be used to control certain aspects and/or functions of digital environment 102. For example, the encoded digital features may be used to restrict certain movements in digital environment 102. In one or more examples, user 150 may select different preferences such as different golfers to begin viewing or as favorites where such data is encoded into encoded data and provided back into the digital environment 102 to limit or otherwise control the digital environment presented to user 150 such as notifying the user of other players at other holes and/or not displaying or providing notifications to players no longer designated or considered favorites. In another example, digital environment 102, responsive to encoded data, may limit user 150 to moving within a limited vicinity in cases where the user 150, whether through action in physical environment 160 or by specifying preferences, has indicated a desire not to move more than a predetermined distance (e.g., 200 yards).

The recommendation also may be encoded by encoder stage 112 and provided back to digital environment 102. In one or more examples, the recommendation may be played or displayed in digital environment 102 so that user 150 may observe the recommendation in the context of digital environment 102. In this regard, the recommendation and/or other aspects of physical environment 160 may be incorporated into digital environment 102. The data processing pipeline may account for cases, e.g., learn, where user 150 does not heed the recommendation. In one or more other embodiments, the encoded data may be provided to decoder stage 114.

In block 320, decoder stage 114 decodes data to generate haptic data 182. For example, decoder stage 114 is trained to generate haptic data 182 from physical features 204 and the recommendation from correlator 108. In one or more other embodiments, decoder stage 114 may be trained to also use encoded data received from encoder stage 112 to generate haptic data 182. In one or more other embodiments, decoder stage 114 further may be trained to generate human readable instructions using encoded data received from encoder stage 112, which also may be used in combination with physical features and/or recommendations, to generate the human readable instructions. In general, haptic data 182, as generated by decoder stage 114, specify the recommendation (e.g., a predicted motion) to be undertaken by user 150 to perform or implement the recommendation. In one or more examples, haptic data 182 may be conveyed as proprioception data and/or signals that, as interpreted by haptic device(s) 180, create phantom movements within physical environment 160 that become preflexors for movement of user 150. Over time, encoder stage 112 and decoder stage 114 process user 150's psychosomatic and environmental variables to create a set of "best moves," as predicted, for creation of movement in physical environment 160.

In block 322, MGS 100 provides haptic data 182 to haptic device(s) 180 of user 150. The haptic data 182 may be conveyed as signals and/or data through one or more intervening devices and/or communication systems/networks. Within physical environment 160, individuals initiate movement through the act of taking a step in a particular direction, for example. More complex movement examples in a physical environment in other contexts in which the inventive arrangements may be used can include the act of throwing a basketball in a basketball hoop or the act of dribbling the basketball. Regardless of the complexity of movement, each act involves a large number of parameters and an understanding of the influence of those parameters on the movement involved. Using wearable haptics, user 150 can directly interact with physical objects. MGS 100 can impart movement to user 150 based on the interactions described by way of the haptic device(s) 180 in physical environment 160.

The recommendation as transformed into haptic data 182 influences user 150's experience within physical environment 160. For example, MGS 100 effectively generates a recommendation as to which locations or regions of physical environment 160 user 150 will enjoy or enjoy the most. By way of haptic data 182, user 150 may be guided to such regions based on proprioception devices that, for example, vibrate muscle spindles that cause user 150 to believe or feel that their leg or arm is moving when it is stationary. The stimulus may then stop. This preflexor instructs how the body as to the particular movement to be undertaken to travel to the location of interest.

In one or more other embodiments, the recommendation as generated by correlator 108 may be provided directly to user 150 or the user 150's device. In another example, the recommendation may be provided to decoder stage 114 with the other data described where decoder stage 114 is trained to generate directional data (e.g., textual direction) for user 150 to implement the recommendation. The directional data may specify the actual recommendation and/or specify instructions such as walk forward, go left, etc.

In the example of FIGS. 2 and 3, in one or more embodiments, encoder stage 112 and decoder stage 114 may be operable concurrently and/or simultaneously in real-time and/or in near real-time. For example, user 150 may interact with digital environment 102 (e.g., a mobile application) while interacting with physical environment 160. In this regard, the data processing pipeline (e.g., formed of causation model builder 206, causation model 106, correlator 108, regressor 212, and encoder-decoder configurator 210) is operable with both encoder stage 112 and decoder stage 114. Operation of the data processing pipeline is capable of providing feedback to encoder stage 112 and digital environment 102 as well as to decoder stage 114 and physical environment 160 in real-time and concurrently thereby allowing both encoder stage 112 and decoder stage 114 to learn and adapt over time. In still other examples, encoder stage 112 and decoder stage 114 may not operate concurrently.

In one or more aspects, as discussed, the inventive arrangements provide technological benefits such as providing increased capabilities for the haptic device(s) 180, dynamically adjusting haptic feedback, and providing a greater depth and/or complexity of haptic feedback as generated by the haptic device(s) 180. For example, decoder stage 114 is capable of learning over time how to provide changing magnitude of haptic feedback. In an illustrative and nonlimiting example, rather than providing a continuous range of magnitude, decoder stage 114 may learn how to vary the magnitude of a signal between a plurality of discrete vales (e.g., 1, 2, 3, 4, or 5 rather than a continuous range) to create or prompt motion of user 150. Leaning to vary the magnitude between discrete values greatly simplifies control of the haptic device(s) 180 over using continuous ranges while still endowing the haptic device(s) 180 with the ability to generate wide ranging and complex haptic feedback. For example, decoder stage 114 may learn to generate sinusoidal haptic feedback using discrete values where decoder stage 114 learns to vary the magnitude between 1 and 5 and/or between 2 and 3, for example, corresponding to different magnitudes and/or types of sinusoidal haptic feedback.

As an example of providing dynamic haptic feedback, decoder stage 114 is capable of providing particular haptic feedback to indicate particular physical movements such as turn right, turn left, go back (turn 180 degrees), etc. Using the aforementioned discrete values other types of haptic feedback may be generated to mimic or simulate a sinusoidal wave. The haptic feedback may be dynamical changed, e.g., magnitude increased and/or decreased or changed to a different type of haptic feedback altogether, based on actual movement and/or location of user 150 within physical environment 160 in real-time and/or near real-time. For example, certain haptic data 182 may cause the magnitude of haptic feedback to increase as the user moves in one direction over another. Haptic data 1802 specifying rapid and short bursts may indicate that the user needs to turn around and move in the opposite direction.

Figure 4A:
FIGS. 4A, 4B, and 4C illustrate example augmentations of a causation model for use with an MGS.
Figure 4B:
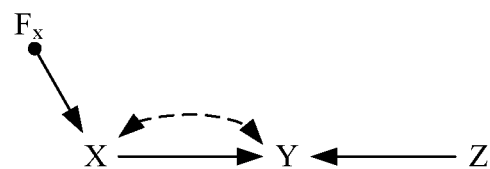
Figure 4C:
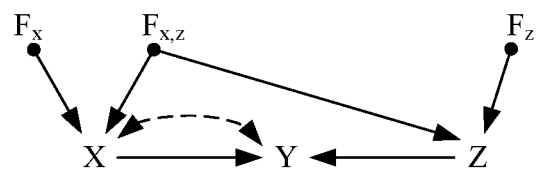

FIGS. 4A, 4B, and 4C, collectively referred to as FIG. 4, illustrate example augmentations of causation model 106. In the example of FIG. 4, causation model 106 is implemented as a DAG. As illustrated in FIG. 4A, the DAG includes 3 states X, Y, and Z. In FIG. 4B, the DAG has been augmented and personalized for user 150. In the example, an additional node has been added. For purposes of illustration, consider the case where digital features 202 did not account for weather conditions. Additional node(s) may be added to the DAG to account for weather data. Weather data for physical environment 160 may be obtained from one or more external sources and modeled within DAG through the insertion of additional nodes and variables. For example, the DAG is augmented with F(x) in FIG. 4B. The DAG is augmented further with F(x, z) and F(z) in FIG. 4C. The additional nodes may be added using the NO TEARS technique previously described. The particular nodes and/or variables to be added may be selected by user 150 to reflect other circumstances or varied scenarios.

In augmenting the DAG, an updated correlation matrix and/or adjacency matrix may be generated to account for these additional scenarios. The DAG, as updated, may then be used to generate further recommendations through the correlation process/technique performed by correlator 108.

In one or more other examples, simulations may be performed using the DAG to generate one or more additional forecasted states that can be used to further augment the DAG resulting in an augmented DAG. The additional forecasted states may be inserted into the DAG as previously described. Updated correlation and adjacency matrices may be generated. In this example, recommendations may be generated using the augmented DAG to guide to the user to selected locations in physical environment 160 prior to the occurrence of a forecasted event of interest. For example, through simulation, it may be determined that there is a higher likelihood of an event of interest, e.g., golfer A making a hole-in-one, at a particular location. In that case, the recommendation may provide haptic signals guiding the user to the hole prior to (e.g., just prior to) golfer A arriving and/or playing that hole in anticipation of user 150 viewing the forecasted event in physical environment 160.

In one or more example implementations, from performing multiple simulations (e.g., performing a Monte Carlo technique to perform multiple simulations), a probability of one or more events occurring in a fixed window or period of time may be determined. For purposes of illustration, a Poisson distribution of the simulated events may be performed to determine the likelihood of an event occurring in the window of time. The Poisson distribution, for example, as created from the simulation data indexed over time, may be used by MGS 100 to determine the probability of an event of interest occurring at least one time within a particular region of physical environment 160. In further illustration, through simulation and application of the Poisson distribution or other suitable probabilistic technique, MGS 100 may determine the probability of an event such as two eagles happening within a particular region on the golf course for a particular group of golfers during a forecasted window of time.

Accordingly, the inventive arrangements are capable of determining a path of interest (e.g., high interest) for user 150 that user 150 should traverse through physical environment 160 based on user 150's digital behavior and the probability of the forecasted (e.g., predicted) event occurring. The relation of causality models to the selection of encoder stage(s) and decoder stage(s) creates both a current and forecasted plan to stimulate the body of user 150 to move within different directions. This proprioception is a preflexor for movement within physical environment 160.

Figure 5:
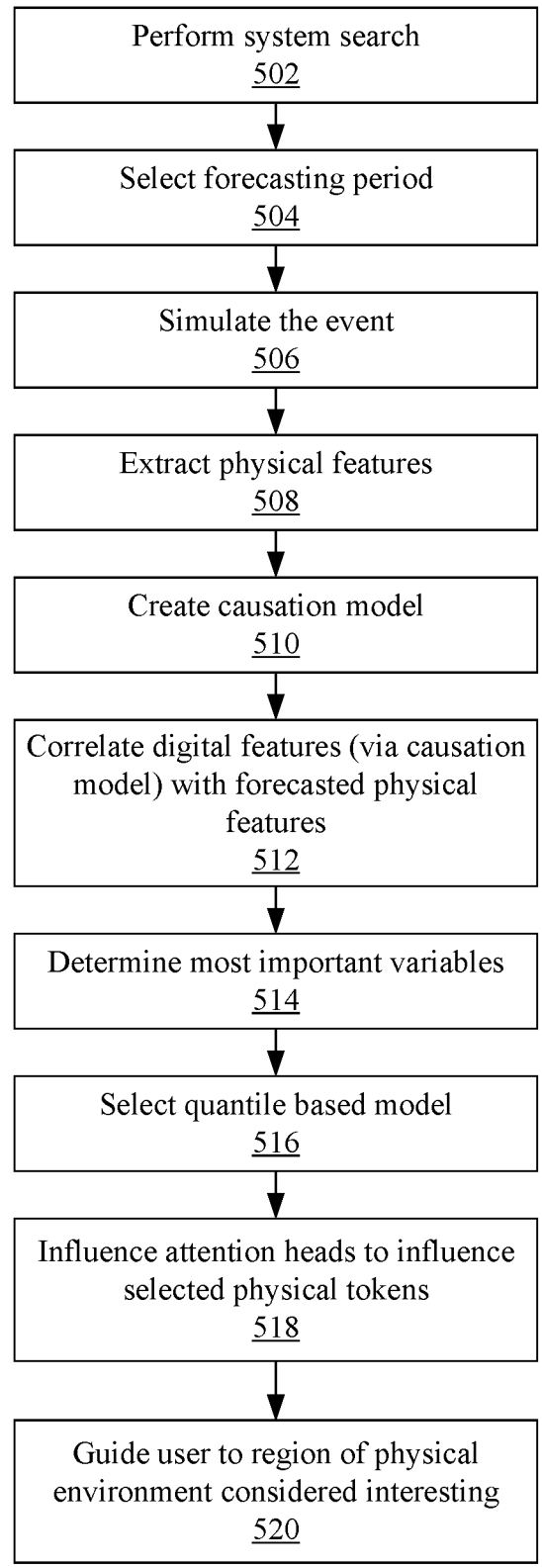
FIG. 5 is an example method illustrating certain operative features of an MGS.

FIG. 5 is an example method 500 illustrating certain operative features of MGS 100. In the example of FIG. 5, method 500 begins in a state where the collection of interactions between user 150 and digital environment 102 and subsequent extraction of digital features 202 has been performed.

In block 502, MGS 100 performs a search. In block 504, MGS 100 selects a forecasting period. In block 506, MGS 100 is capable of simulating a particular event within digital environment 102. In block 508, physical feature extractor 110 is capable of extracting physical features 204. In block 510, causation model builder 206 is capable of creating or building causation model 106. In block 512, correlator 108 is capable of correlating digital features 202 with forecasted physical features using causation model 106. In block 514, MGS 100 is capable of determining selected (e.g., important or most important) variables. The important variables (e.g., features) may be selected based on the correlation matrix. In block 516, encoder-decoder configurator 210 is capable of selecting quantile-based models (e.g., selecting the activation function to be used for the quantiles). In block 518, attention heads are influenced using the Poisson distribution to influence selected (e.g., important or most important) physical tokens (e.g., features). The attention heads may be adjusted within encoder stage 112 and decoder stage 114. In block 520, the user is guided to a region of physical environment 160 considered interesting or most interesting to user 150 based on the important physical tokens.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 6:
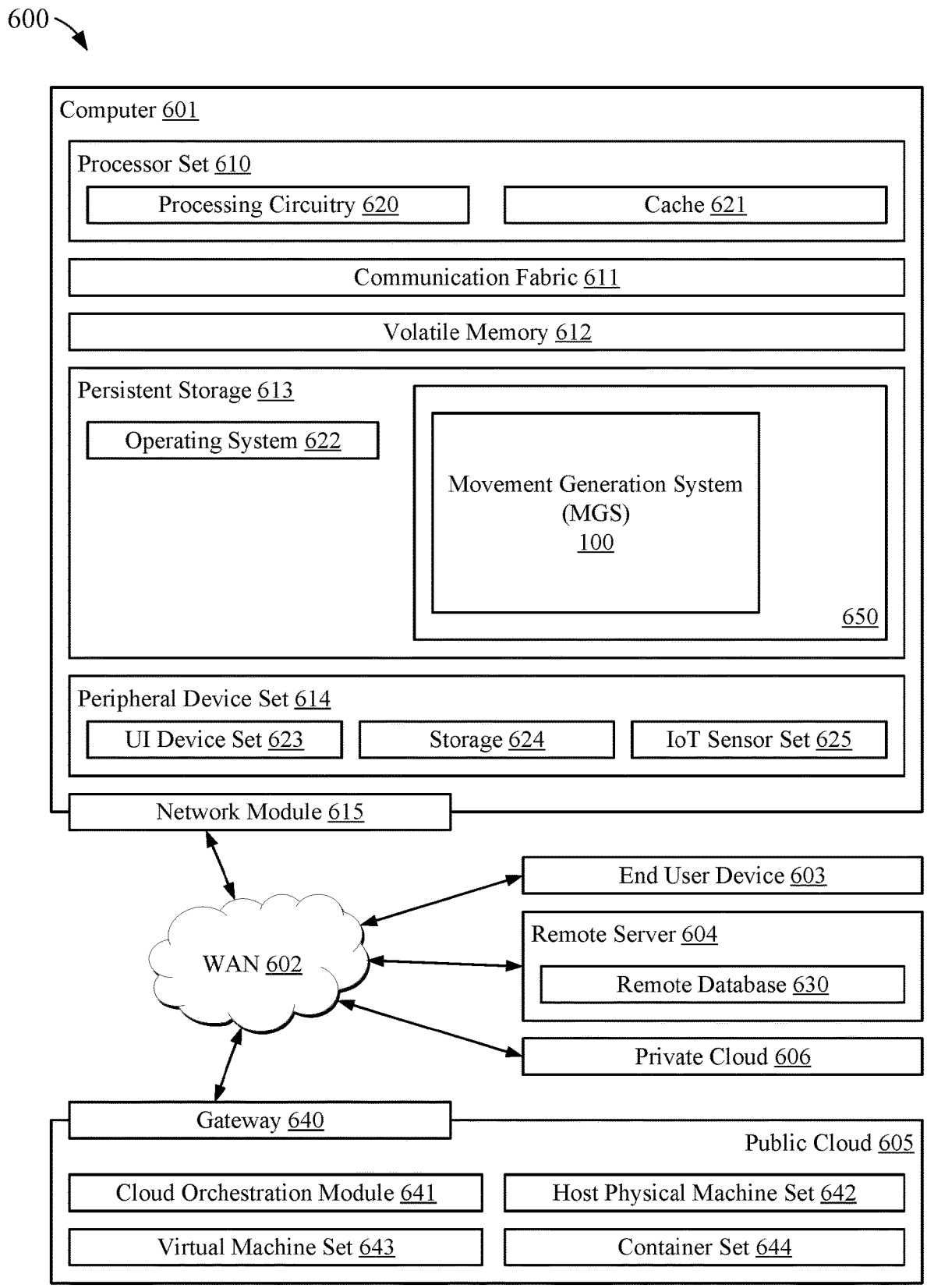
FIG. 6 is an example of a computing environment for use with an MGS.

FIG. 6 illustrates an example of a computing environment 600. Computing environment 600 contains an example of an environment for the execution of at least some of the computer code in block 650 involved in performing the inventive methods, such as MGS 100 illustrated in block 650, which may be implemented as executable program code or instructions. MGS 100 is capable of evaluating digital features as extracted from interactions of a user with digital environment 102 and physical features 204 as extracted from user 150 within physical environment 160 and/or from physical environment 160 itself to generate recommendations for user 150. The recommendations may be transformed or translated into haptic data 182 conveyed to haptic device(s) 180 of user 150 within physical environment 160. The haptic data 182, as interpreted by the haptic device(s) 180, suggest movement to the user in furtherance of the recommendation. In addition to block 650, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and block 650, as identified above), peripheral device set 614 (including user interface (UI) device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

Computer 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

Processor set 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in block 650 in persistent storage 613.

Communication fabric 611 is the signal conduction paths that allow the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 612 is any type of volatile memory now known or to be developed in the future. Examples include dynamic type random access memory (RAM) or static type RAM. Typically, the volatile memory is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

Persistent storage 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid-state storage devices. Operating system 622 may take several forms, such as various known proprietary operating systems or open-source Portable Operating System Interface type operating systems that employ a kernel. The code included in block 650 typically includes at least some of the computer code involved in performing the inventive methods.

Peripheral device set 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion type connections (e.g., secure digital (SD) card), connections made though local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (e.g., where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

Network module 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (e.g., embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (e.g., the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 603 is any computer system that is used and controlled by an end user (e.g., a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

Remote server 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

Public cloud 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (e.g., private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

The terminology used herein is for the purpose of describing particular embodiments only and is not intended to be limiting. Notwithstanding, several definitions that apply throughout this document now will be presented.

The term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the term "processor" means at least one hardware circuit configured to carry out instructions. The instructions may be contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The term "user" means a human being.

The terms first, second, etc. may be used herein to describe various elements. These elements should not be limited by these terms, as these terms are only used to distinguish one element from another unless stated otherwise or the context clearly indicates otherwise.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    extracting, by computer hardware, digital features from interactions of a user with a digital environment that models a physical environment, wherein
        the physical environment is a geographic region,
        the digital environment comprises a computer-based simulation of the physical environment, and
        the digital features include locations of the user within the digital environment corresponding to geographic locations in the physical environment, a set of events occurring in the digital environment, and dwell times of the user viewing the set of events within the digital environment;
    extracting, by the computer hardware, physical features from sensor data generated from detected interactions of the user with the physical environment, wherein
        the sensor data is generated by one or more sensors including a global positioning sensor configured to provide location information for the user within the geographic region, and
        the interactions of the user within the digital environment occur prior to the detected interactions of the user within the physical environment;
    generating, by the computer hardware, a recommendation for the user based on a correlation of the digital features with the physical features, wherein
        the recommendation specifies a movement to a geographic location associated with a new event that occurs in the physical environment, and
        the geographical location is different from a current geographic location of the user within the physical environment;
    generating haptic data by decoding, using a decoder stage executed by the computer hardware, the physical features and the recommendation; and
    providing the haptic data to a haptic device of the user, wherein the haptic data controls the haptic device to generate haptic feedback indicating a direction of movement for the user toward the geographic location within the physical environment.

2. The computer-implemented method of claim 1, wherein the haptic data controls the haptic device to provide the haptic feedback at a particular time.

3. The computer-implemented method of claim 1, further comprising:
    encoding, using an encoder stage executed by the computer hardware, the digital features to generate encoded data, wherein the encoded data is provided to the decoder stage.

4. The computer-implemented method of claim 1, wherein the haptic data is transmitted to the haptic device of the user, and wherein the haptic device is a mobile device.

5. The computer-implemented method of claim 3, further comprising:
    dynamically selecting different activation functions for use with the encoder stage and the decoder stage over time.

6. The computer-implemented method of claim 1, further comprising:
    forecasting an event occurring within the physical environment based on the interactions of the user with the digital environment simulating the physical environment,
    wherein the geographic location corresponds to a location of the event as forecasted.

7. The computer-implemented method of claim 1, further comprising:
dynamically varying a magnitude of the haptic feedback as specified by the haptic data based on at least one of movement or location of the user within the physical environment.

8. The computer-implemented method of claim 1, wherein the interactions of the user with the digital environment are used to generate the recommendation for the movement of the user in the physical environment.

9. The computer-implemented method of claim 8, wherein the recommendation is generated by matching a context defined by the physical features as extracted with a portion of a causation model generated based on the digital features.

10. A system, comprising:
one or more processors configured to execute operations including:
extracting digital features from interactions of a user with a digital environment that models a physical environment, wherein
the physical environment is a geographic region,
the digital environment comprises a computer-based simulation of the physical environment, and
the digital features include locations of the user within the digital environment corresponding to geographic locations in the physical environment, a set of events occurring in the digital environment, and dwell times of the user viewing the set of events within the digital environment;
extracting physical features from sensor data generated from detected interactions of the user with the physical environment, wherein
the sensor data is generated by one or more sensors including a global positioning sensor configured to provide location information for the user within the geographic region, and
the interactions of the user within the digital environment occur prior to the detected interactions of the user within the physical environment;
generating a recommendation for the user based on a correlation of the digital features with the physical features, wherein
the recommendation specifies a movement to a geographic location associated with a new event that occurs in the physical environment, and
the geographical location is different from a current geographic location of the user within the physical environment;
generating haptic data by decoding, using a decoder stage, the physical features and the recommendation; and
providing the haptic data to a haptic device of the user, wherein the haptic data controls the haptic device to generate haptic feedback indicating a direction of movement for the user toward the geographic location within the physical environment.

11. The system of claim 10, wherein the haptic data controls the haptic device to provide the haptic feedback at a particular time.

12. The system of claim 10, wherein the one or more processors are configured to execute the operations further comprising:
encoding, using an encoder stage executed by the one or more processors, the digital features to generate encoded data, wherein the encoded data is provided to the decoder stage.

13. The system of claim 10, wherein the haptic data is transmitted to the haptic device of the user, and wherein the haptic device is a mobile device.

14. The system of claim 12, wherein the one or more processors are configured to execute the operations further comprising:
dynamically selecting different activation functions for use with the encoder stage and the decoder stage over time.

15. The system of claim 14, wherein the one or more processors are configured to execute the operations further comprising:
forecasting an event occurring within the physical environment based on the interactions of the user with the digital environment simulating the physical environment,
wherein the geographic location corresponds to a location of the event as forecasted.

16. The system of claim 10, wherein the one or more processors are configured to execute the operations further comprising:
dynamically varying a magnitude of the haptic feedback as specified by the haptic data based on at least one of movement or location of the user within the physical environment.

17. The system of claim 10, wherein the interactions of the user with the digital environment are used to generate the recommendation for the movement of the user in the physical environment.

18. The system of claim 17, wherein the recommendation is generated by matching a context defined by the physical features as extracted with a portion of a causation model generated based on the digital features.

19. A computer program product comprising one or more computer readable storage mediums having program instructions embodied therewith, wherein the program instructions are executable by one or more processors to cause the one or more processors to execute operations comprising:
extracting digital features from interactions of a user with a digital environment that models a physical environment, wherein
the physical environment is a geographic region,
the digital environment comprises a computer-based simulation of the physical environment, and
the digital features include locations of the user within the digital environment corresponding to geographic locations in the physical environment, a set of events occurring in the digital environment, and dwell times of the user viewing the set of events within the digital environment;
extracting physical features from sensor data generated from detected interactions of the user with the physical environment, wherein
the sensor data is generated by one or more sensors including a global positioning sensor configured to provide location information for the user within the geographic region, and
the interactions of the user within the digital environment occur prior to the detected interactions of the user within the physical environment;
generating a recommendation for the user based on a correlation of the digital features with the physical features, wherein
the recommendation specifies a movement to a geographic location associated with a new event that occurs in the physical environment, and the geographical location is different from a current geographic location of the user within the physical environment;

generating haptic data by decoding, using a decoder stage, the physical features and the recommendation; and providing the haptic data to a haptic device of the user, wherein the haptic data controls the haptic device to generate haptic feedback indicating a direction of movement for the user toward the geographic location within the physical environment.

20. The computer program product of claim 19, wherein the haptic data controls the haptic device to provide the haptic feedback at a particular time.

* * * * *